United States Patent
Lahav et al.

(10) Patent No.: US 8,089,035 B2
(45) Date of Patent: Jan. 3, 2012

(54) CMOS IMAGE SENSOR WITH HIGH SENSITIVITY WIDE DYNAMIC RANGE PIXEL FOR HIGH RESOLUTION APPLICATIONS

(75) Inventors: Assaf Lahav, Binyamina (IL); Amos Fenigstein, Haifa (IL)

(73) Assignee: Tower Semiconductor Ltd., Migdal Haemek (IL)

( * ) Notice: Subject to any disclaimer, the term of this patent is extended or adjusted under 35 U.S.C. 154(b) by 412 days.

(21) Appl. No.: 12/424,333

(22) Filed: Apr. 15, 2009

(65) Prior Publication Data

US 2009/0261235 A1     Oct. 22, 2009

Related U.S. Application Data

(60) Provisional application No. 61/045,480, filed on Apr. 16, 2008.

(51) Int. Cl.
*H01L 27/00* (2006.01)
(52) U.S. Cl. .................. 250/208.1; 250/214 R
(58) Field of Classification Search ............... 250/214 R, 250/208.1, 214 P, 214 LA, 214 LS; 348/296–308, 348/315, 216.1, 239; 257/291, 292
See application file for complete search history.

(56) References Cited

U.S. PATENT DOCUMENTS 7,235,772 B2   6/2007  Ko et al.
7,489,352 B2 * 2/2009  Nakamura ..................... 348/296

OTHER PUBLICATIONS

Kavusi et al. "Quantitative Study of High-Dynamic-Range Image Sensor Architectures", Proceedings of the SPIE, vol. 5301, Jun. 2004, pp. 264-275.
Lul'e et al. "Design and Fabrication of a High Dynamic Range Image Sensor in TFA Technology", IEEE Journal of Solid-State Circuits 34(5), May 1999, pp. 704-711.
Stoppa et al. "Novel CMOS Image Sensor with a 132-dB Dynamic Range", IEEE Journal of Solid-State Circuits 37(12), Dec. 2002, pp. 1846-1852.

* cited by examiner

*Primary Examiner* — Que T Le
(74) *Attorney, Agent, or Firm* — Bever, Hoffman & Harms, LLP; Patrick T. Bever (57) ABSTRACT

A CMOS image sensor in which each pixel includes a conventional pinned diode (photodiode), a Wide Dynamic Range (WDR) detection (e.g., a simplified time-to-saturation (TTS)) circuit, a correlated double sampling (CDS) circuit, and a single output chain that is shared by both the CDS and WDR circuits. The pinned diode is used in the conversion of photons into charge in each pixel. In one embodiment, light received by the photodiode is processed using a TTS operation during the CDS integration phase, and the resulting TTS output signal is used to determine whether the photodiode is saturated. When the photodiode is saturated, the TTS output signal is processed to determine the amount of light received by the photodiode. When the photodiode is not saturated, the amount of light received by the photodiode is determined using signals generated by the readout phase of the CDS operation.

16 Claims, 10 Drawing Sheets

CMOS IMAGE SENSOR WITH HIGH SENSITIVITY WIDE DYNAMIC RANGE PIXEL FOR HIGH RESOLUTION APPLICATIONS

RELATED APPLICATIONS

This application claims priority of U.S. Provisional Patent Application 61/045,480, entitled "High Sensitivity Wide Dynamic Range Pixel For High Resolution Applications" filed Apr. 16, 2008.

FIELD OF THE INVENTION

This invention relates to CMOS image sensors, and more particularly to CMOS image sensors for high resolution applications.

BACKGROUND OF THE INVENTION

CMOS image sensors are used in, for example, video cameras, and generally include a two dimensional array of pixels that is fabricated on a semiconductor substrate using standardized CMOS fabrication techniques. Each pixel includes a sensing element (e.g., a photodiode) that is capable of converting a portion of an optical image into an electronic (e.g., voltage) signal, and access circuitry that selectively couples the sensing element to control circuits dispose on a periphery of the pixel array by way of metal address and signal lines. The metal address and signal lines are supported in insulation material that is deposited over the upper surface of the semiconductor substrate, and positioned along the peripheral edges of the pixels to allow light to pass between the metal lines to the sensing elements through the insulation material. CMOS image sensors typically contain millions of pixels which transform photons coming from a photographed scene into millions of corresponding voltage signals, which are stored on a memory device and then read from the memory device and used to regenerate the optical image on, for example, a liquid crystal display (LCD) device.

A conventional method for utilizing a CMOS image sensor to capture an image involves detecting the amount of light applied to each pixel using a fully pinned photodiode (PD) which enables the read charge using a correlated double sampling (CDS) methodology. The CDS methodology includes an integration phase and a readout phase. The integration phase includes "resetting" the charge on a particular photodiode (i.e., full transfer of all electrons in the photodiode to the system voltage source (VDD)), then decoupling the photodiode from the voltage source for a predetermined integration time, and then measuring the collected charge at the end of the integration time. During the integration time photoelectrons accumulate at the PD, with the rate being directly proportional to the amount of light received by the photodiode. A floating diffusion (FD) can be coupled to the photodiode by a transfer gate (TG) transistor or to the VDD by a reset transistor. The CDS readout phase involves performing two sample and hold (S/H) operations. The first S/H operation involves coupling the FD to VDD and measuring the resulting voltage on the FD to provide a S/H reset value, which is used as a reference voltage. Next, the FD is coupled to the photodiode by turning on the TG so that all photoelectrons are transferred from the PD to the FD, causing the FD voltage to drop. The second S/H operation (S/H signal) is performed immediately after all photoelectrons are transferred from the photodiode and the TG is deactivated, and again involves measuring the resulting voltage on the FD to provide a S/H signal value. Since the reference voltage exists both in S/H reset and S/H signal values, subtracting the two values results a noiseless signal value that accurately represents the amount of light received by that pixel.

Although CMOS image sensors have some merits compared to the human eye (capture speed or performing relatively well at extreme environment conditions), the human eye currently performs better when it come to image processing or dynamic range than CMOS image sensors operated using conventional CDS methods. Dynamic range is defined as the largest signal (in the non-saturated region) in the pixel divided by smallest signal which can be correctly detected under dark conditions (typical dominated by the sigma of the temporal noise of read circuits). The human eye typically can capture 90 db of scene dynamic range while standard image sensor for imaging application is capable of recording between 60 to 72 db in its linear operating range. Problems associated with correctly capturing (i.e., "photographing") the dynamic range in a scene are known from the early days of photography, where photographs used to underexpose a photography film in order to capture highlight (bright) details of a scene, and "overexpose" a film in order to observe lowlight (dark) details in the scene. Although CMOS image sensors have improved significantly in the last decade in their ability to observe details in the dark (lowlight) areas of the scene (mainly by reducing the electronic read out noise, for example, with the use of pinned diode-type photodiodes with CDS), the dynamic range of CMOS image sensors still remains well below that of the human eye in their ability to capture all details in an uncontrolled lighting environment from shadows to bright areas using one exposure. That is, photodiodes exhibit a linear operating range in relatively low exposure (exposure is the flux of light over a given integration time), wherein the charge at the end of the integration time is directly proportional to the amount of received light. In contrast, when exposure conditions exceed the linear operating range of the photodiode (i.e., the light is too bright) and the photodiode approaches saturation during the integration time, the photodiode begins to react in a nonlinear manner, or stops collecting electrons altogether. In this case the pixel cannot represent correctly the amount of received light; moreover, the cross-over point between linear region and saturation is not well defined, and this causes the spatial noise to rise significantly from a typical 0.8% to more than 5%. When the light reaches a maximum brightness, the photodiode becomes entirely saturated during the integration time, and essentially the same readout signal is produced for all light having the maximum brightness or higher.

There are several known methods to increase dynamic range of CMOS image sensor pixel beyond its normal linear range (herein "Wide Dynamic Range" or "WDR" methods) including time-to-saturation, multiple capture, synchronous self reset with multiple capture, and asynchronous self reset with multiple capture. Of these WDR methods, the present invention is focused on the time-to-saturation (herein TTS) method, which is known in the art and is described briefly below. Additional description and a discussion regarding the advantages and disadvantages of all four of the methods mentioned above are described, for example, in, "Quantitative Study of High-Dynamic-Range Image Sensor Architectures," S. Kavusi and A. El Gamal, Proceedings of the SPIE, vol. 5301, pp. 264-275, June 2004.

The TTS method achieves high dynamic range with high signal-to-noise ratio (SNR) by converting each photocurrent into its time-to-saturation $t_{sat}(i_{ph})$ according to Equation 1 (below):

$$t_{sat} = \frac{q \times \text{Full\_Well}}{i_{ph}} \quad \text{(Eq. 1)}$$

In Equation 1, Full_Well is the maximum well capacity of the pixel in its linear range, and q is the electron charge. In effect, the TTS method involves deriving the amount of illumination on a pixel by determining how long it takes for the photodiode to become saturated, where short $t_{sat}$ values indicate a relatively bright image region (high illumination), and long $t_{sat}$ values indicate a relatively dark image region (low light). In one conventional TTS pixel (e.g., see "Design and fabrication of a high dynamic range image sensor in TFA technology," T. Lul'e, B. Schneider, and M. Bohm, IEEE Journal of Solid-State Circuits 34(5), pp. 704-711, May 1999), each $t_{sat}$ value is determined by integrating the photodiode current on an integration capacitance. On every rising edge of the clock input, this voltage is compared to a reference voltage. If the integrated signal is smaller from the reference the integration time is extended. If the signal is higher than the reference the comparator terminates the integration via the switches. With every clock, the time-stamp input climbs up one step and is sampled and held in the timestamp capacitance at the moment the integration is terminated. The information at every pixel consists of two voltages that are read out: the integrated signal and the time stamp voltage, where the time stamp voltage stamp is only important if the pixel did not reach saturation at the end of integration). This TTS method is thus contrary to the conventional CDS method, discussed above, where a constant integration time is used, and where each pixel integrates the photocurrent into charge ($Q(I_{ph})=t_{int} \times I_{ph}$). In the conventional CDS case, although the pixel size is small, it is clear that there will be no additional data on the local illumination intensity if the pixel reaches a charge above its capacity ($Q_{max}=q \times \text{Full\_Well}$). This limitation is avoided using the TTS by timing how long it takes before saturation of the photodiode charge is reached.

Although the TTS method avoids the limitations of conventional CDS methods, TTS pixels are generally impractical for high resolution sensors because they typically require large amount of transistors to perform the TTS operation (e.g., to provide both the integrated signal and time stamp values). A similar problem exists for the other methods used increase dynamic range of CMOS image sensor pixel beyond the normal linear range.

What is needed is a pixel for a CMOS image sensor that both provides a high dynamic range (i.e., 90 db or greater), and has a low fill-factor such that the pixel can be used in the production of CMOS image sensors having very high resolution

SUMMARY OF THE INVENTION

The present invention is directed to a CMOS image sensor in which each pixel includes a conventional pinned diode (photodiode), a Wide Dynamic Range (WDR) detection (e.g., a simplified time-to-saturation (TTS)) circuit, a correlated double sampling (CDS) circuit, and a single output chain that is shared by both the CDS and WDR circuits. By providing both CDS and WDR detection circuitry in each pixel, CMOS image sensors formed in accordance with the present invention combine the low noise capabilities of a modern CMOS pixel (which will help observe details in shadows) and the possibility to record extremely high illumination well beyond a photodiode's linear range, thereby providing a wide dynamic range (i.e., 90 db or greater). Further, by utilizing a single output chain to transmit the signals from both the WDR and CDS circuits, the number of transistors needed to form each pixel can be minimized, thereby providing low fill-factor pixels that facilitate the production of CMOS image sensors having very high resolution.

According to an embodiment of the present invention, a pinned diode is used in the conversion of photons into charge in each pixel, thereby allowing the pixels of the present invention to facilitate capturing relatively dark image regions (i.e., when the incident light generates a charge that is within the linear operating range of the pinned diode) using true CDS methodology within each pixel.

According to another embodiment of the present invention, a method for measuring an amount of light received by a photodiode in a CMOS image sensor generally includes performing a time-to-saturation (TTS) operation during the integration phase of a correlated double sampling (CDS) operation, thereby facilitating wide dynamic range operation using a single exposure. In addition, the present invention provides a process for utilizing the resulting TTS output signal to determine whether the photodiode is saturated, and then determining the amount of light received by the photodiode using the TTS output signal when the photodiode is saturated, or determining the amount of received light using signals generated by the readout phase of the CDS operation when the photodiode is not saturated. By performing both CDS and TTS operations in this manner, CMOS image sensors formed in accordance with the present invention have a wider dynamic range with higher accuracy than sensors utilizing only one of these operations. Further, by utilizing the TTS output signal to both determine photodiode saturation and the amount of stored charge when the photodiode is saturated, the present invention facilitates minimizing the size of each pixel of the CMOS image sensor, thereby providing pixels having a low fill-factor that facilitate the production of CMOS image sensors having very high resolution.

According to a specific embodiment of the present invention, each CMOS image sensor pixel utilizes a pair of floating diffusions that are electrically coupled to the photodiode by way of corresponding transfer gates, and the TTS circuit includes a simple inverter forming a feedback circuit that is controlled by a voltage stored on the first capacitor to store the TTS output signal on the second capacitor by way of a feedback transistor during the integration phase of the CDS operation. Electrons in the photodiode are accumulated in a finite potential well. As more and more electrons are collected, higher energy levels are populated. The electrons are bounded to this potential well by two barriers imposed by the transfer gates. When electrons reach the maximum capacity of the pinned PD, they can start leak over the barriers imposed by both gates. Now, the barrier over the first transfer gate coupled between the photodiode and the first capacitor is little smaller than the barrier over the second transfer gate coupled between the photodiode and the second capacitor, This is very important feature in the pixel design and there are two ways to implement it. First, provide perfectly symmetrical transfer gates and change the operating point of the inverter to be above "0" (e.g., 0.2V using the assignee's technology, but in general should be between 0 and the transfer gate Vt). The second method is break symmetry between the two transfer gates, and design the first transfer gate to have lower barrier than the second transfer gate. In this case the first transfer gate will be set to zero during integration. Since the barrier is smaller for the first transfer gate, electrons will leak through the first transfer gate and not through the second transfer gate.

According to another aspect of the specific embodiment, the CMOS image sensor supplies a ramp voltage to the second capacitor by way of the feedback transistor during the integration phase of the CDS operation, and monitors a saturation level of the photodiode using the first capacitor. The charges stored on the photodiode and first and second capacitors is reset to VDD at the beginning of the integration period, and then the photodiode and first capacitor are decoupled (i.e., caused to float). While the photodiode remains unsaturated, the inverter maintains the feedback transistor in a "turned on" state (i.e., such that the ramp voltage is passed to the first capacitor). If the photodiode becomes saturated at a point during the integration time period, the resulting low photodiode charge leaks to the first capacitor, which causes the inverter to flip, thereby turning off the feedback transistor. The "captured" charge on the second capacitor, which represents the level of the ramp voltage at the time the photodiode became saturated, provides an analog TTS output signal that can be used to calculate bright light illumination (i.e., illumination above the linear operating range of the photodiode). According to another aspect, if the photodiode remains unsaturated at the end of the integration time period, the ramp voltage shifts to a predetermined voltage level (e.g., VDD), which is stored on the second capacitor. The subsequent readout phase includes three sample-and-hold (S/H) events. During the first S/H event, the TTS output signal (i.e., either the "captured" charge or VDD, depending on whether the photodiode became saturated during the integration phase) is transferred through the output chain. During the second S/H event, a "reset" voltage (VDD) is passed to the second capacitor and then transferred through the output chain. During the third S/H event, the fully-integrated photodiode charge is transferred from the photodiode to the second capacitor by way of the second transfer gate, and then read using two sample-and-hold events according to known CDS operations, and then passed through the output chain. Thus, the CDS circuit utilizes the second capacitor to generate CDS output signals after the TTS output signal is transferred out of the pixel. This arrangement greatly reduces the number of transistors required to implement the TTS and CDS operations.

According to another aspect of the specific embodiment, the TTS output signal generated during the readout phase is then analyzed to determine if it is equal to VDD (i.e., indicating that saturation did not occur during the integration period), or less than VDD (i.e., indicating that saturation occurred during the integration period). When the TTS output signal is less than VDD, the pixel output is determined using a TTL calculation based on the voltage level of the TTS output signal. Conversely, when the TTS output signal is equal to VDD, the pixel output is determined using a CDS calculation based on the CDS output signals generated during the second and third S/H events. This approach provides efficient processing of both TTS and CDS values, thus facilitating CMOS image sensors having a wide dynamic range.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in CMOS image sensors. The following description is presented to enable one of ordinary skill in the art to make and use the invention as provided in the context of a particular application and its requirements. The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or by way of the source/drain terminals of a transistor). Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
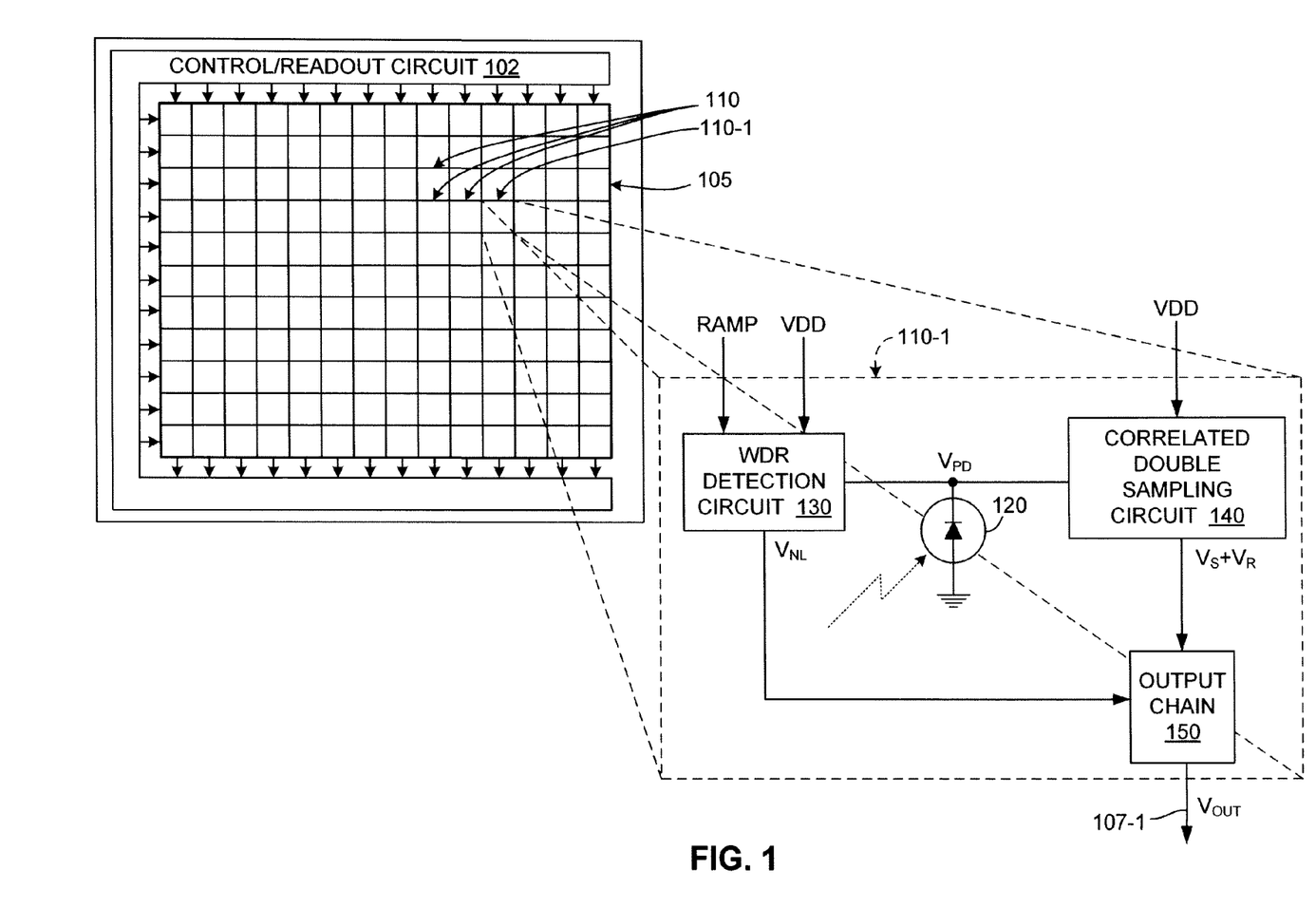
FIG. 1 is a simplified perspective diagram showing a CMOS image sensor according to an embodiment of the present invention.

FIG. 1 is a simplified diagram showing a CMOS image sensor 100 formed in accordance with a generalized embodiment of the present invention. CMOS image sensor 100 is similar to conventional CMOS image sensors in that it includes a pixel array 105 including pixels 110 arranged in rows and columns, and control/readout circuitry 102 that access, control and process signals received from each of the pixels by way of associated metal signal lines passing between the rows and columns of pixels 110.

According to an aspect of the present invention, CMOS image sensor 100 differs from conventional CMOS image sensors in that, as exemplified by pixel 110-1 (depicted in an enlarged form on the right side of FIG. 1), each pixel 110 of array 105 includes both a WDR detection circuit 130 and a correlated double sampling (CDS) circuit 140 for determining the charge generated on a photodiode 120, where both non-linear output data $V_{NL}$ and CDS output data $V_S$ and $V_R$ are transmitted from a shared output chain 150. Thus, pixel 110 is characterized in part in that it uses a WDR (e.g., time-to-saturation (TTS)) methodology implemented by circuit 130 to capture bright light portions of an image. As set forth above, the use of TTS methodology is used in prior art imaging devices to achieve wide dynamic range, but was implemented by using large numbers of transistors to create comparators, counters, separate readout for the TTS values, and in some applications an A/D converter at each pixel site. These conventional TTS pixels cannot be used for large imaging applications due to a small fill factor and huge pixel size which limits images resolution. As set forth by the specific embodiment provided below, by combining portions of a TTS circuit with CDS circuit 140 such that output chain 150 is shared by both circuits, the present invention provides a CMOS image sensor pixel that exhibits both a wide dynamic range (i.e., 90 db or greater) and a low fill-factor, thereby facilitating the production of CMOS image sensors having very high resolution. Those skilled in the art will recognize that the approaches set forth below can be extended to involve other WDR methodologies as well.

According to an embodiment of the present invention, a conventional pinned diode is used to implement photodiode 120 in the conversion of photons into charge in each pixel 110. By utilizing a pinned diode 120 in the conversion of photons into charge, the pixels of the present invention facilitate capturing relatively dark image regions (i.e., when the incident light generates a charge that is within the linear operating range of the pinned diode) using true CDS methodology within each pixel. In contrast, when the incident light causes saturation of the photodiode, WDR (TTS) circuit 130 is utilized to capture an analog value that accurately determines the level of illumination. By combining both CDS circuit 140 and TTS circuit 130 with pinned diode (photodiode) 120 in each pixel 110, CMOS image sensor 100 combines the low noise capabilities of a modern CMOS pixel (which will help observe details in shadows) and the possibility to record extremely high illumination well beyond its linear range, using a single exposure, thereby providing a wide dynamic range (i.e., 90 db or greater).

Figure 2:
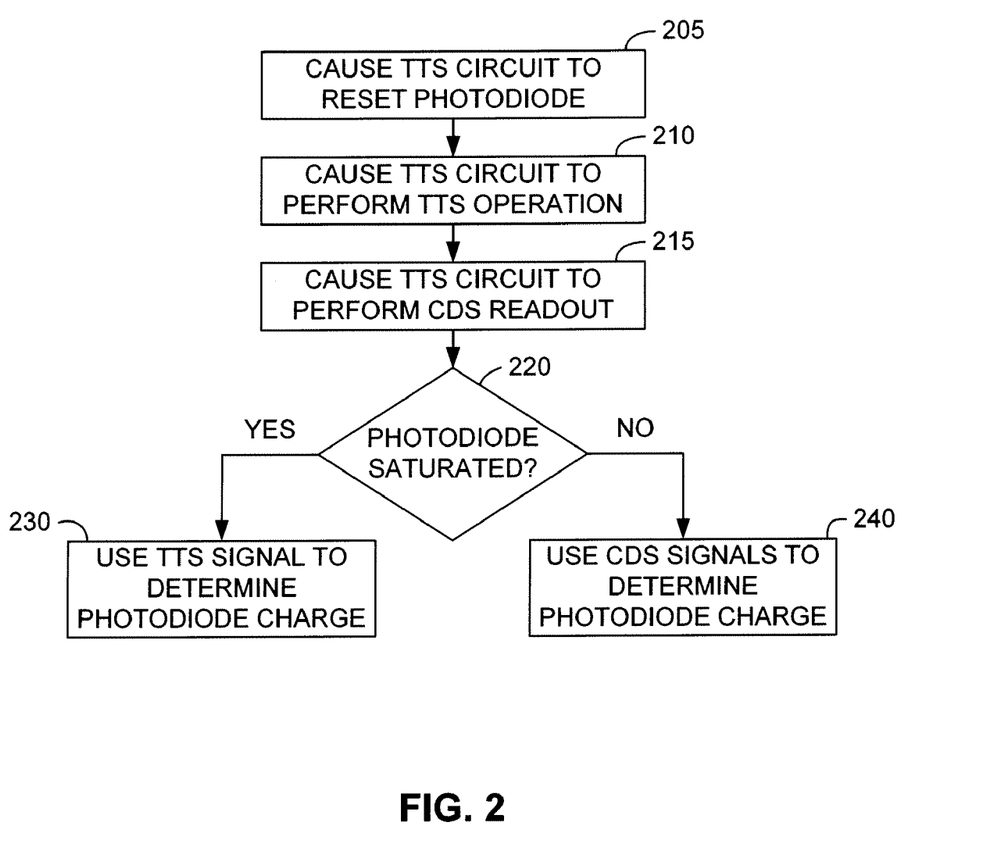
FIG. 2 is a flow diagram showing a method for measuring light received by a pixel of the CMOS image sensor of FIG. 1 according to another embodiment of the present invention.

As indicated by the flow diagram shown in FIG. 2 and referring to pixel 110 of FIG. 1, according to another aspect of the present invention, a method for measuring an amount of light received by photodiode 120 generally includes resetting photodiode 120 (block 205) to initiate the integration phase of a CDS operation, performing a TTS operation during the integration phase (block 210), and then performing a readout phase of the CDS operation after the integration phase is completed (block 215). In one embodiment, resetting photodiode 120 includes coupling photodiode 120 to system voltage (reset charge) VDD. A TTS (first) output signal $V_{TTS}$ generated by TTS circuit 130 is passed to output chain 150, from which it is transmitted as pixel output signal $V_{OUT}$ onto signal line 107-1, for example, at the beginning of the CDS readout phase. Subsequently, a CDS (second) output signals $V_S$ and $V_R$ generated by CDS circuit 140 is passed to output chain 150, from which it is transmitted as pixel output signal $V_{OUT}$ onto signal line 107-1. By performing the TTS operation during the integration phase of the CDS operation, the present invention facilitates wide dynamic range operation using a single exposure of photodiode 120. The TTS and CDS operations described above are initiated using control signals generated by control/readout circuit 102 according to timing characteristics described in further detail below, and transmitted to pixels 110 utilizing addressing schemes understood by those skilled in the art.

Referring to the lower portion of FIG. 2, referring to pixel 110 of FIG. 1, control/readout circuit 102 then determines the amount light received by photodiode 120 by determining if photodiode 120 is saturated (block 220), and then either using TTS output signal $V_{TTS}$ (block 230) or CDS output signals $V_S$ and $V_R$, depending on whether saturation is detected or not. That is, when saturation of photodiode 120 is detected, indicating the charge on photodiode 120 exceeds the linear operating range of photodiode 120, TTS output signal $V_{TTS}$ is utilized to determine the amount of received light. Conversely, when photodiode 120 remains unsaturated during the integration phase (i.e., the charge on photodiode 120 remains within its linear operating range), CDS output signals $V_S$ and $V_R$ are utilized to determine the amount of received light. Specific control/readout suitable for converting TTS output signal $V_{TTS}$ and CDS output signals $V_S$ and $V_R$ to signals representative of the amount light received by photodiode 120 can be generated by those skilled in the art, and therefore are not described in additional detail herein.

According to another aspect of the present invention, the process of determining whether photodiode 120 is saturated or not (block 220; see FIG. 2) is performed by analyzing the TTS output signal $V_{TTS}$. In one specific embodiment that is described in additional detail below, TTS circuit 130 is constructed such that the signal level of TTS output signal $V_{TTS}$ is generated within a predetermined voltage range and linearly proportional to the time-to-saturation period when photodiode 120 is saturated, and is generated as a fixed voltage (e.g., VDD or 0V) when photodiode 120 is not saturated. Using this approach, control readout circuit 102 determines whether photodiode 120 is saturated, for example, by determining if TTS output signal $V_{TTS}$ is equal to the preselected fixed voltage (e.g., VDD or 0V). When TTS output signal $V_{TTS}$ is not equal to the preselected fixed voltage, photodiode 120 is determined to be saturated (block 230), and TTS output signal $V_{TTS}$ is utilized to determine the amount of light received by photodiode 120. Conversely, when TTS output signal $V_{TTS}$ is equal to the preselected fixed voltage, photodiode 120 is determined to be unsaturated (block 240), and CDS output signals $V_S$ and $V_R$ are utilized to determine the amount of light received by photodiode 120. Those skilled in the art will recognize that determining saturation of photodiode 120 using TTS output signal $V_{TTS}$ may be implemented using other comparison methods as well and the present invention is therefore not intended to be limited to the specific approaches described herein. By utilizing TTS output signal $V_{TTS}$ to determine whether photodiode 120 is saturated, and also to determine the amount of light received by photodiode 120 when photodiode 120 becomes saturated during the integration time, the present invention facilitates minimizing the size of TTS circuit 130 and CDS circuit 140 used in each pixel 110, thereby facilitating the production of CMOS image sensors having very high resolution.

Figure 3:
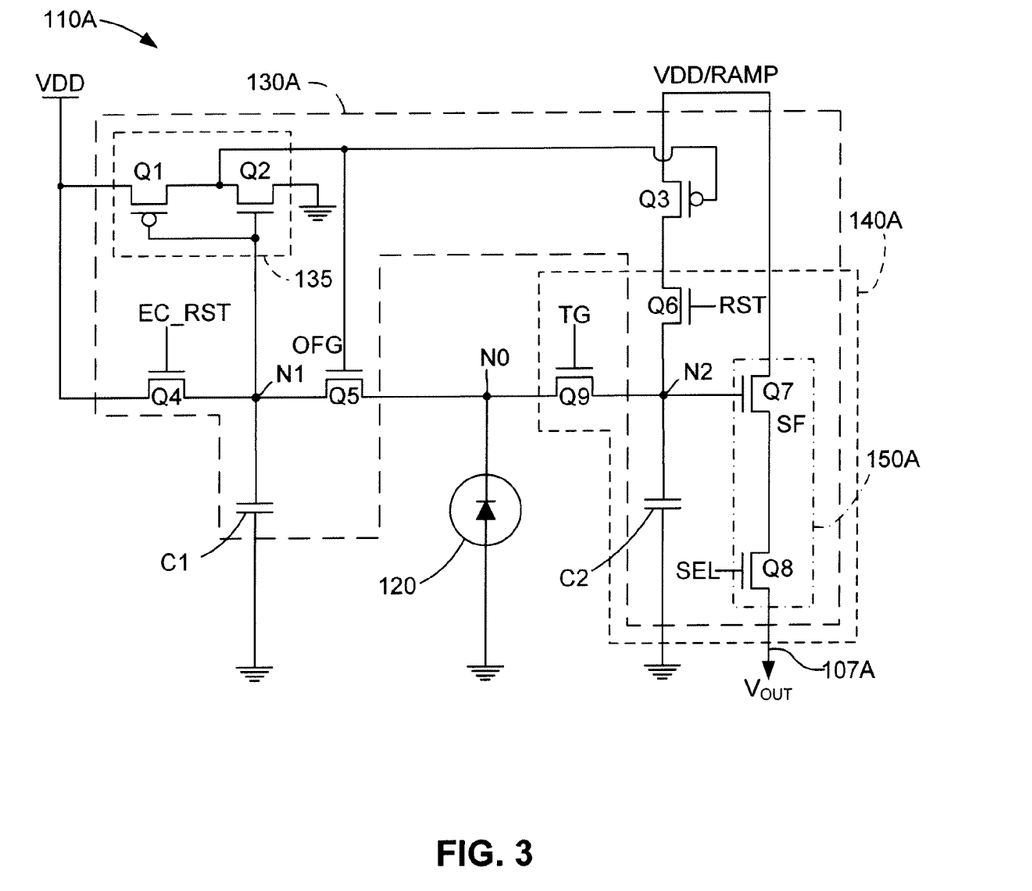
FIG. 3 is a simplified circuit diagram showing a pixel of a CMOS image sensor according to a specific embodiment of the present invention.

FIG. 3 is a simplified circuit diagram showing a pixel 110A of a CMOS image sensor formed in accordance with a specific embodiment of the present invention. Pixel 110A is utilized, for example, in place of pixel 110 in FIG. 1, and is addressed by corresponding control/readout circuitry similar to that described above with reference to FIG. 1. Pixel 110A generally includes a pinned diode (photodiode) 120A, two capacitances (floating diffusions) C1 and C2, and nine transistors Q1 to Q9 that are all formed in accordance with standard CMOS fabrication techniques. As indicated by the dashed lined boxed in FIG. 3, floating diffusions C1 and C2 and transistors Q1 to Q9 are utilized to form TTS circuit 130A and a CDS circuit 140A, where diffusions C1 and C2 and transistors Q1 to Q8 form TTS circuit 130A, diffusion C2 and transistors Q6 to Q9 form CDS circuit 140A, and transistors Q7 and Q8 form an output chain 150A that is shared by TTS circuit 130A and CDS circuit 140A. In the disclosed embodiment, transistors Q2 and Q4-Q9 are NMOS transistors, and transistors Q1 and Q3 are PMOS transistors. For reference purposes, a charge accumulated on the pinned diode 120A is present on node N0, a voltage stored on capacitor (diffusion) C1 is present on node N1, and a voltage stored on capacitor (diffusion) C2 is present on node N2. Transistors Q5 and Q9 form transfer gates between pinned diode 120A and diffusions C1 and C2, with transfer gate Q5 being connected between nodes N0 and N1, and transfer gate Q9 being connected between nodes N0 and N2.

According to another aspect of the present invention, TTS circuit 130A utilizes a simple inverter 135 formed by transistors Q1 and Q2 to form a feedback loop that is controlled by voltage stored on first capacitor C1 in order to store an analog TTS output signal $V_{TTS}$ on second capacitor C2 during the integration phase of the CDS operation. Transistors Q1 and Q2 of inverter 135 are connected in series between system voltage source VDD and ground, with the gate terminals of transistors Q1 and Q2 forming an input terminal of inverter 135 and being connected to node N1, and a node between transistors Q1 and Q2 forming an output terminal of inverter 135 and being connected to the gate terminals of transfer gate Q5 and feedback transistor Q3. A first reset transistor Q4 is connected between system voltage source VDD and node N1, and is controlled by a control signal EC_RST. Feedback transistor Q3 is connected between a second voltage source VDD/RAMP and a second reset transistor Q6, whose second terminal is connected to node N2 and is controlled by a control signal RST. Transistor Q7 is connected between second voltage source VDD/RAMP and select transistor Q8, with the gate terminal of transistor Q7 being connected to node N2, and the gate terminal of select transistor Q8 being controlled by a "select" control signal SEL. Thus, output chain 150A is formed by source-follower transistor Q7 and select transistor Q8 in which source-follower transistor Q7 buffers the voltage signal on node N1, and the buffered output signal is passed to the column (control/readout) circuits by way of select transistor Q8, which is turned on/off by control signal SEL in accordance with the timing schedule set forth below. In accordance with one embodiment, select transistor Q8 singles out one signal line 107A out of the array during readout.

In accordance with another aspect of the present invention, CDS circuit 140A utilizes second capacitor C2, second reset transistor Q6, output chain 150A, which as mentioned above are utilized to form a part of TTS circuit 130A, and also includes second transfer gate Q9, which is controlled by a control signal TG. Those skilled in the art will recognize CDS circuit 140A as forming a standard four transistor (4T) arrangement used in conventional CMOS image sensors that utilize CDS operations. By utilizing a portion of this standard 4T arrangement to facilitate TTS operations, the arrangement shown in FIG. 3 greatly reduces the number of transistors required in the past to implement the TTS and CDS operations separately, thereby further facilitating the production of CMOS image sensors having very high resolution.

As set forth above and described in additional detail with reference to timing diagrams below, each CMOS image sensor pixel 110A utilizes a pair of floating diffusions (capacitors) C1 and C2 that are electrically coupled to pinned photodiode 120A by way of corresponding transfer gates Q5 and Q9, and TTS circuit 130A includes a simple inverter 135 forming a feedback circuit that is controlled by a voltage stored on capacitor C1 to store the TTS output signal $V_{TTS}$ on capacitor C2 by way of feedback transistor Q3 during the integration phase of the CDS operation. Thus, electrons in photodiode 120A are accumulated in a finite potential well that is bounded by two barriers imposed by transfer gates Q5 and Q9. During integration, as more and more electrons are collected, higher energy levels are populated. When electrons reach the maximum capacity of photodiode 120A, they start to leak over the barriers imposed by transfer gates Q5 and Q9. In one embodiment, the barrier over transfer gate Q5 is made a little smaller than the barrier over transfer gate Q9. This is very important feature in the pixel design, and there are two ways to implement it. First, perfectly symmetrical transfer gates Q5 and Q9 are fabricated, and then the operating point of inverter 135A is changed to be above "0V" (e.g., 0.2V using a 0.18 um technology utilized by Tower Semiconductor, Ltd., but in general should be between 0V and Vt). The second method is to break symmetry between transfer gates Q5 and Q9, and design transfer gate Q5 to have lower barrier than that of transfer gate Q9. In this case transfer gate Q5 will be set to zero during integration. Since the barrier is smaller for transfer gate Q5, electrons will leak through transfer gate Q5 and not through transfer gate Q9.

Figure 4A:
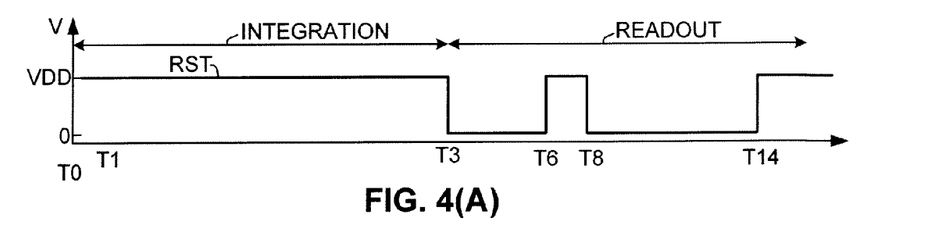
FIGS. 4(A), 4(B), 4(C), 4(D) and 4(E) are timing diagrams showing control signals transmitted to the pixel of FIG. 3 during operation.

FIGS. 4(A) to 4(E) are timing diagrams depicting control signals transmitted to pixel 110A (FIG. 3) during operation according to another embodiment of the present invention, and FIGS. 5(A) to 5(G) are circuit diagrams depicting the operating states and current paths generated in pixel 110A at selected time periods of the operation. As indicated in FIG. 4(A), the timing diagrams of FIGS. 4(A) to 4(E) are divided into integration and reading phases that are continuously repeated during operation of the associated CMOS image sensor.

Figure 4B:
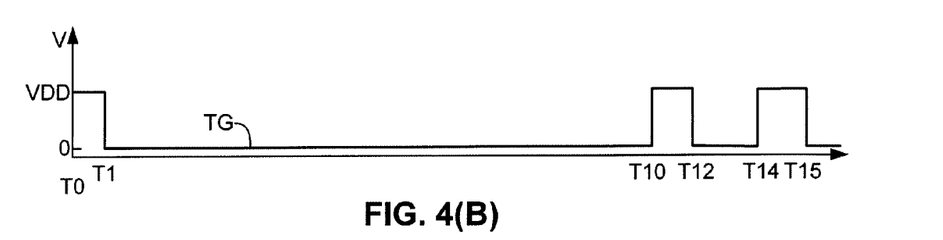
Figure 4C:
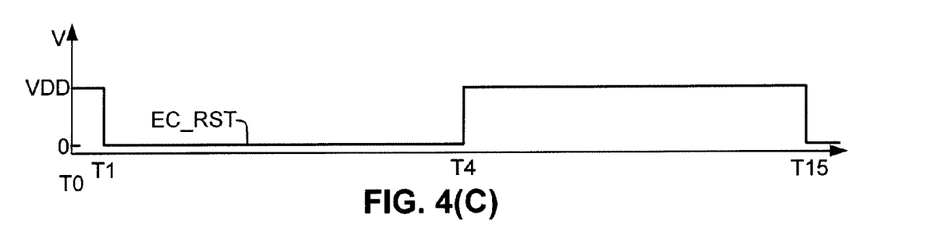
Figure 4D:
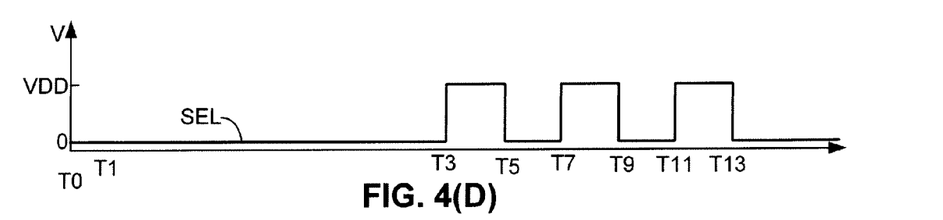
Figure 4E:
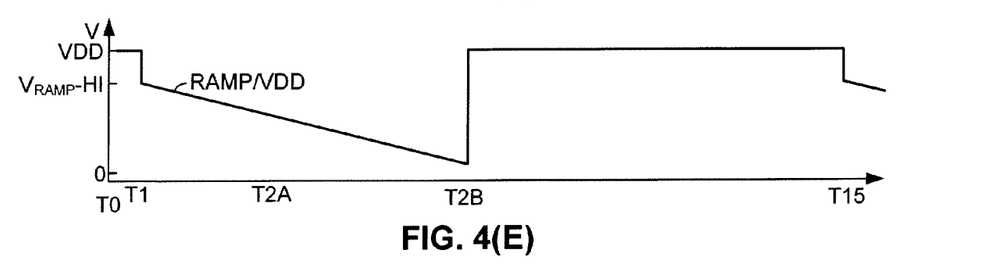
Figure 5A:
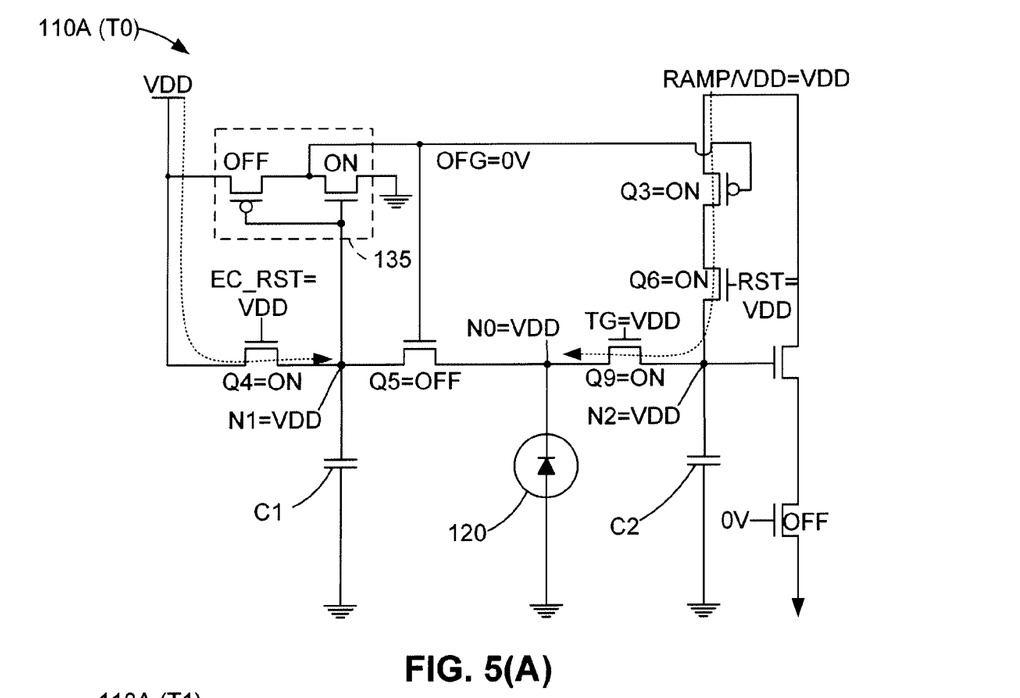
FIGS. 5(A), 5(B), 5(C), 5(D), 5(E), 5(F), and 5(G) are simplified circuits diagram showing operating states within the pixel of FIG. 3 during operation.

Referring to the left side of FIGS. 4(A) to 4(E) and to FIG. 5(A), prior to the beginning of the integration phase (the end of a previous reading phase), control/readout circuitry (not shown) resets photodiode 120A and grounded diffusions C1 and C2 such that a predetermined reset charge (e.g., VDD) is stored on nodes N1 and N2 at the beginning of the integration phase. In the present embodiment, this reset operation is performed by activating (turning on) transfer gate Q9 and reset transistors Q6 and Q4. These activations are achieved by maintaining control signals RST (FIG. 4(A)), TG (FIG. 4(B)), and EC_RST (FIG. 4(C)) at a high (VDD) voltage level. Referring to FIG. 5(A), the high control signal EC_RST causes reset transistor Q4 to pass system voltage VDD to node N1, causing inverter 135 to generate a low inverter output signal OFG that turns off transfer gate Q5 and turns on feedback transistor Q3. Notice that the RAMP/VDD signal is maintained at VDD during this period, and is passed through feedback transistor Q3 and reset transistor Q6 to node N1, and from node N1 through transfer gate Q9 to node N0.

Figure 5B:
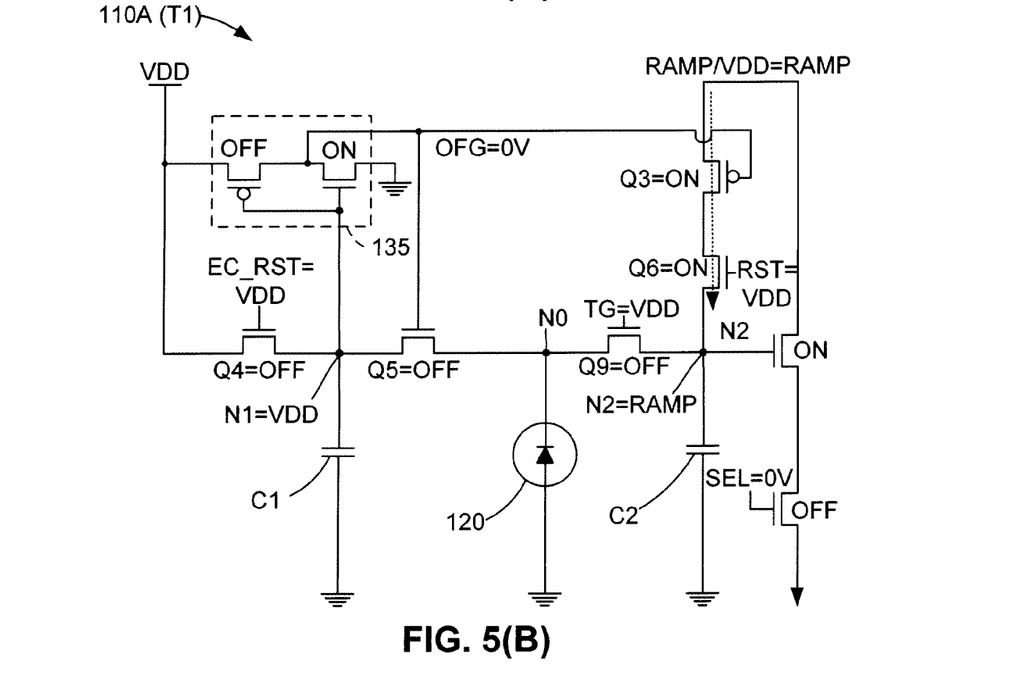

Referring back to the left side of FIGS. 4(A) to 4(E) and to FIG. 5(B), at the beginning of the integration phase (time T1) control signals TG (FIG. 4(B)) and EC-RST (FIG. 4(C)) are de-asserted, and the RAMP/VDD signal shifts from VDD to RAMP. De-asserting control signal TG causes transfer gate Q9 to turn off, which isolates photodiode 120A (i.e., node N0) from node N2, whereby changes to the voltage applied to node N2 do not affect the voltage at node N0. De-asserting control signal EC-RST causes reset transistor Q4 to turn off, which isolates node N1 (i.e., diffusion C1 is essentially floating at this point). Immediately after control signal TG is de-asserted, the RAMP/VDD signal shifts down from VDD to a predetermined maximum ramp voltage level $V_{RAMP}$-HI, and begins to ramp down as indicated in FIG. 4(E). In one embodiment there is a one to one correspondence between integration time and the RAMP/VDD voltage. Note that, as shown in FIG. 4(E), at the end of the integration phase (i.e., time T2B), the RAMP/VDD signal shifts from a low ramp voltage back to VDD.

According to another aspect of the present invention, inverter 130A (FIG. 3) is arranged such that an output signal OFG generated at the output terminal of the inverter causes said feedback transistor Q3 to pass the ramp signal RAMP to said second node N2 while said photodiode remains unsaturated T1-T2A, and such that the output signal of the inverter changes to cause said feedback transistor Q3 to block passage of the ramp signal to node N2 at a point T2A when said photodiode becomes saturated, whereby said second capacitor C2 captures an analog time-to-saturation value VRAMP (T2A) of said ramp voltage indicating the point when said photodiode became saturated. That is, referring to FIGS. 4(E) and 5(B), at the beginning of the integration phase (i.e., as the RAMP signal begins to ramp down from $V_{RAMP}$-HI), the photodiode charge at node N0 begins changes in response to the amount of incident light in accordance with characteristics of photodiode 120A that are understood by those skilled in the art. At the beginning of this period, while the photodiode is depleted from electrons the voltage at node N1 also remains high, thereby causing inverter 135 to continue to generate output signal OFG at a high level that causes feedback transistor Q3 to pass ramp signal RAMP/VDD to node N2. From this point, the operation of pixel 110A can go through two different scenarios set forth in the following paragraphs.

Figure 5C:
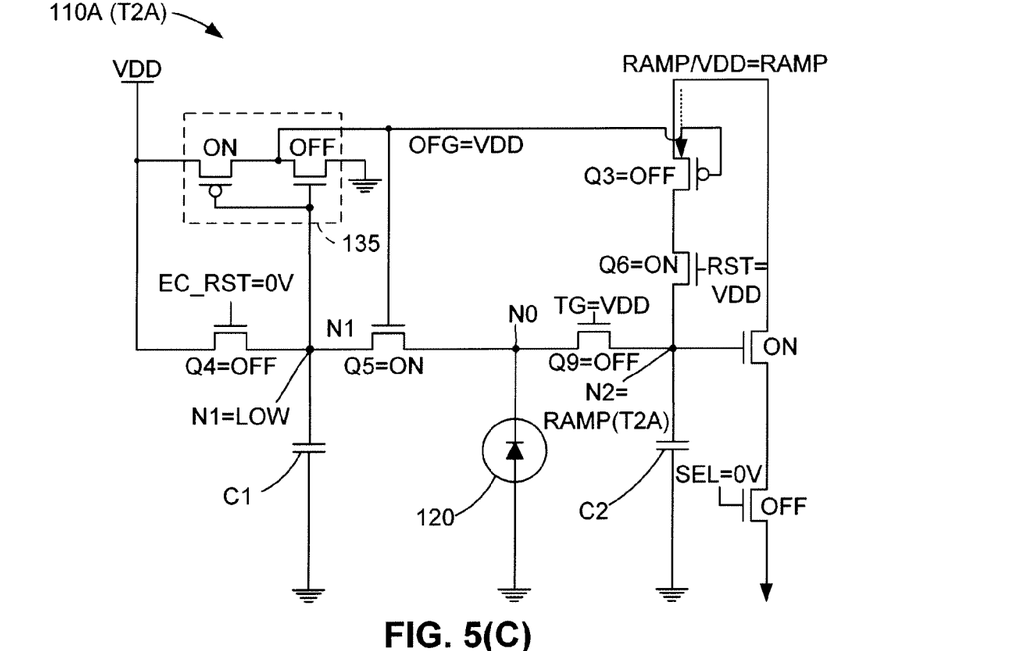

In the first scenario, described with reference to FIGS. 4(E) and 5(C), pixel 110A is exposed to a relatively bright part of the scene, whereby the photodiode accumulates photoelectrons at node N0 relatively quickly toward saturation, causing electrons to leak to capacitor C1 such that voltage at node N1 begins to decrease. Lower voltages at node N1 (i.e., at the input terminal of inverter 135A) will cause a higher inverter output voltage OFG to be applied to transfer gate Q5 and feedback transistor Q3. Because higher voltages on transfer gate Q5 means increasing the electron leakage current from node N0 to node N1, the leakage accelerates, and inverter 135A "flips", causing output signal OFG to switch from low to high (the inverter will flip from low output to high output). The now-high inverter output will cause transfer gate Q5 to turn fully on, and feedback transistor Q3 to de-activate (turn off), as shown in FIG. 5(C). Referring to FIG. 4(E), assuming inverter 135A flips at time T2A, the ramp voltage value transmitted through feedback transistor Q3 at the time of the flip is $V_{RAMP}$-T2A. Thus, when feedback transistor Q3 is turned off by inverter 135A, the voltage $V_{RAMP}$-T2A is captured on node N2, and is present on node N2 at the end of the integration phase (i.e., further decreases or increases of the ramp voltage are blocked from node N2 by feedback transistor Q3).

Figure 5D:
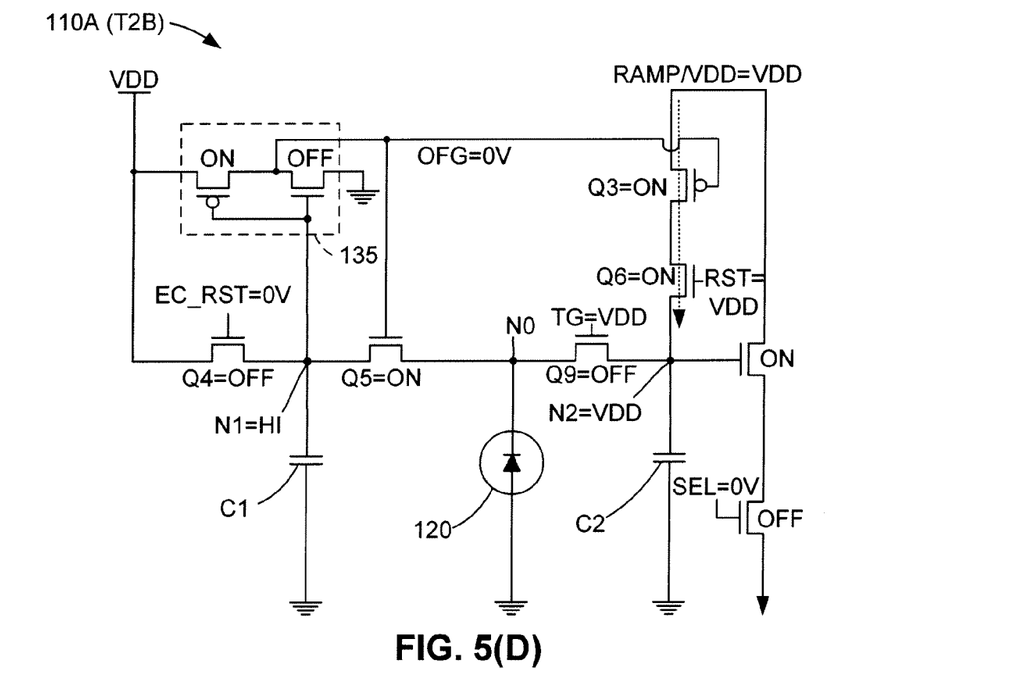

In the second scenario, described with reference to FIGS. 4(E) and 5(D), pixel 110A is exposed to a relatively dark (low light) part of the scene, whereby the photodiode accumulates photoelectrons at node N0 slowly and does not saturate during the integration phase (i.e., photodiode 120A remains unsaturated, or in its linear operating range). Because the photodiode charge at node N0 remains relatively high, the voltage at node N1 also remains high, thereby maintaining inverter output signal OFG low, thus causing feedback transistor Q3 to continue passing ramp signal RAMP/VDD to node N2. Under these conditions, feedback transistor Q3 is still open at the end of the integration period, such that when signal RAMP/VDD shifts back to VDD, the voltage on node N2 also shifts to VDD. Note that the low inverter output signal OFG also keeps transfer gate Q5 closed strongly (off) while photodiode 120A is integrating.

Figure 5E:
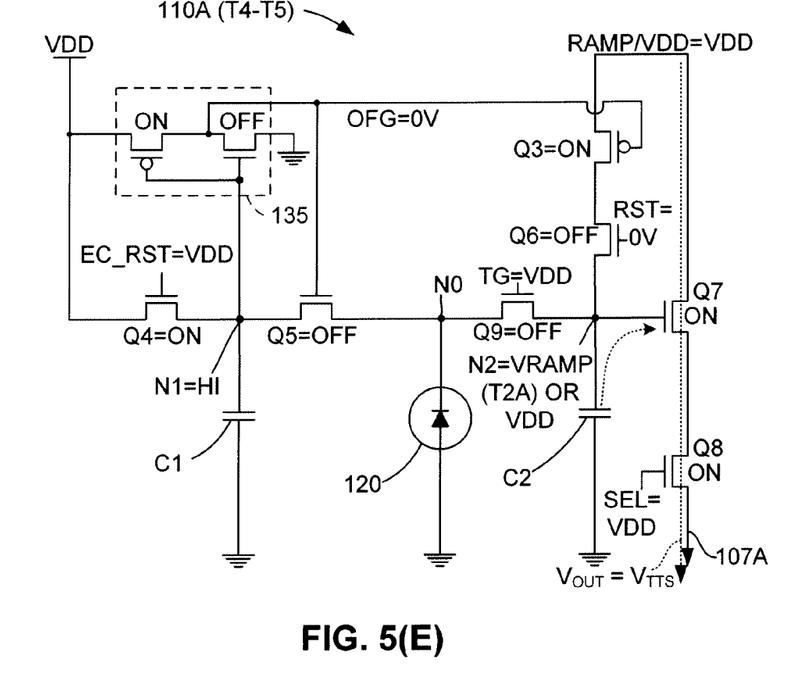

As indicated in FIG. 4(A), the readout phase immediately follows the integration phase, and as set forth below, involves three sample-and-hold (S/H) events that are used to pass the TTS output voltage (i.e., the voltage on node N2 at time T2B) and two CDS output signals that are described below. Referring to FIGS. 4(A), 4(C) and 4(D), at the beginning of the readout phase the reset voltages are toggled and the select signal is asserted immediately after the RAMP/VDD signal shifts to VDD. In particular, as shown in FIG. 4(A), reset signal RST shifts low at time T3, thereby turning off reset transistor Q6, and reset signal EC_RST shifts high, thereby turning on reset transistor Q4. As indicated in FIG. 5(E), turning off reset transistors Q4 and Q6 serves to isolate (capture) the voltage at node N2, which at time T2B is either the ramp voltage at point in time when inverter 135A flipped (i.e., $V_{RAMP}$-T2A) or VDD.

The first (exposure) S/H event, which involves generating a TTS output signal ($V_{TTS}$) using the voltage at node N2 at time T2B. Note that the voltage at node N2 is applied to the gate terminal of source-follower transistor Q7, thereby turning on source-follower transistor Q7 by an amount proportional to charge F2, and passing a corresponding portion of VDD to select transistor Q8. Referring to FIG. 4(D), in the present embodiment select signal SEL is asserted at time T3, thereby turning on select transistor Q8 to pass the TTS output signal $V_{TTS}$ as pixel output signal $V_{OUT}$ onto signal line 107A. Signal line 107A is sampled by the control/readout circuit (not shown) using known techniques at a point between time T4 and T5 (i.e., when select signal SEL is de-asserted—see FIG. 4(D)), thus completing the first S/H event.

Figure 5F:
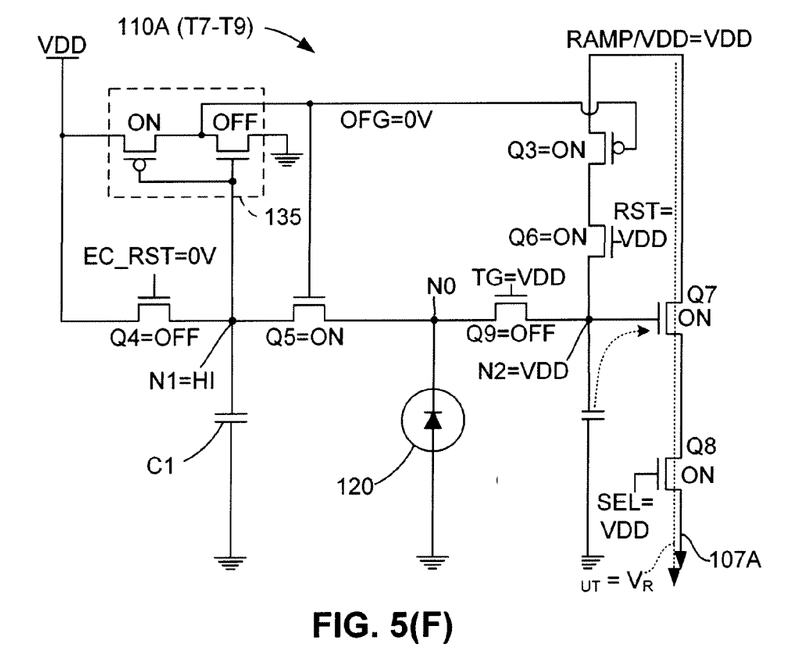
Figure 5G:
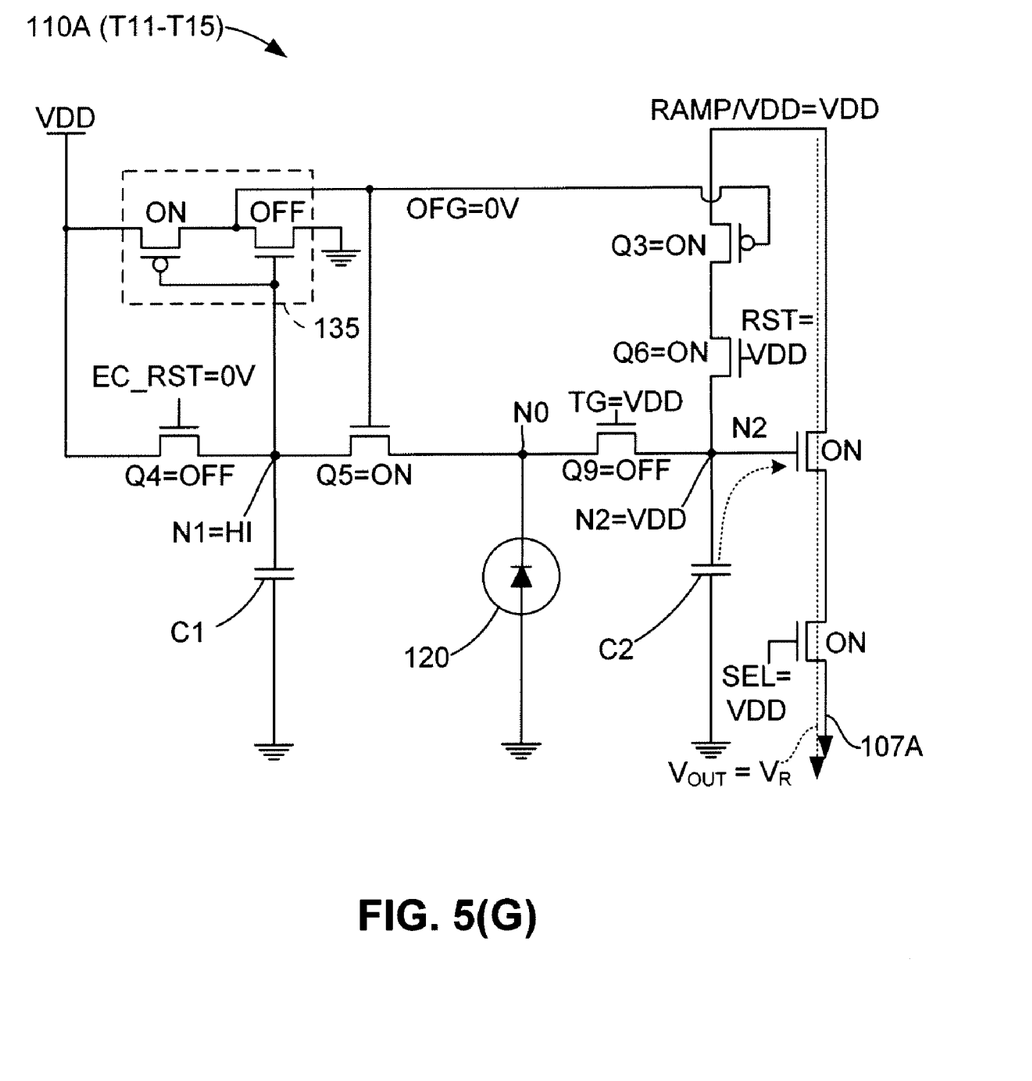

The second (reset) S/H event and the third (signal) S/H event are then are then performed in a manner similar to that performed in a conventional 4T pixel using double correlated sampling. Referring to FIGS. 4(A) and 5(F), to implement the second S/H event, reset signal RST is asserted at time T6 (note that feedback transistor Q3 is already on) to pass VDD to node N2, thereby fully turning on source-follower transistor Q7. Referring to FIG. 4(D), select signal SEL is re-asserted at time T7, thereby turning on select transistor Q8 to pass the CDS reset output signal $V_R$ as pixel output signal $V_{OUT}$ onto signal line 107A. Signal line 107A is sampled by the control/readout circuit (not shown) using known techniques at a point between time T7 and T9 (i.e., when select signal SEL is again de-asserted to end the second S/H event—see FIG. 4(D)). The third S/H event is subsequently initiated by asserting transfer gate signal TG at time T10 (see FIG. 4(B) and FIG. 5(G)) to pass the photodiode charge from node N0 to node N2, thereby causing source-follower transistor Q7 to turn on by an amount proportional to the remaining photodiode charge. Referring again to FIG. 4(D), select signal SEL is re-asserted at time T11, thereby turning on select transistor Q8 to pass the CDS output signal $V_S$ as pixel output signal $V_{OUT}$ onto signal line 107A. Signal line 107A is sampled by the control/readout circuit (not shown) using known techniques at a point between time T11 and T13 (i.e., when select signal SEL is again de-asserted—see FIG. 4(D)), thereby ending the third S/H event.

At the end of the readout period (time T14), the reset signal RST (FIG. 4(A)) and transfer gate signal TG (FIG. 4(B)) are again turned to reset photodiode 120A, and at time T15 transfer gate signal TG is again toggled low (FIG. 4(B)) and reset signal EC_RST is de-asserted (FIG. 4(C)), thereby isolating capacitors C1 and C2, and initiating the next integration phase. An optional fourth S/H event (not shown) may be performed at the beginning of the integration phase (e.g., including time T15) to provide a reference signal used in the calculation of the TTS output signal.

As set forth in the generalized embodiment described above with reference to FIGS. 1 and 2, the TTS and CDS output signals generated by pixel 110A are then processed by control/readout circuitry to determine the illumination received by photodiode 120A during the integration phase.

Figure 6:
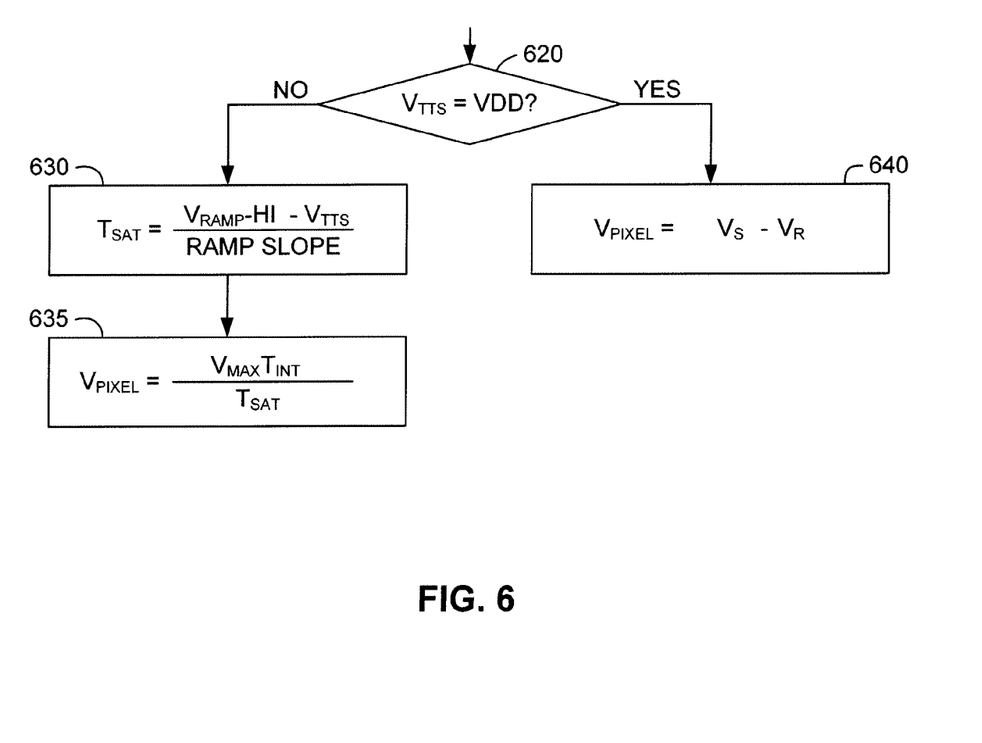
FIG. 6 is a simplified flow diagram showing a generalized operation performed by a CMOS image sensor using TTS and CDS output signals generated by the pixel of FIG. 3.

FIG. 6 is a simplified flow diagram showing a method for processing the TTS and CDS output signals generated in accordance with the operations described above by each pixel 110A that are generated, and generating a corresponding pixel signal $V_{PIXEL}$ that represents the image data for than pixel. The method is performed using a software algorithm or hardwired circuitry according to methods understood by those skilled in the art. First, it is decided if pixel 110A was saturated during the integration phase (i.e., photodiode 120A received more signal than that consistent with it's usual linear operating range (block 620). In the present embodiment, the decision is based on whether the TTS output voltage $V_{TTS}$ is equal to VDD. If TTS output voltage $V_{TTS}$ is not equal to (i.e., less than) VDD, the number of photons received by the pixel is larger than the allowed max, and $V_{PIXEL}$ is found by first calculating the time to saturation ($T_{SAT}$) using $V_{TTS}$ and the ramp slope according to Equation 2, below (see also block 630):

$$T_{SAT} = \frac{V_{TTS}\_high - V_{exposure}}{exposure\_slope} \quad \text{(Eq. 2)}$$

where $V_{exposure}\_$high is the voltage at node N2 at the start of integration. Secondly, after $T_{SAT}$ is known, $V_{PIXEL}$ is calculated by the Equation 3, below (see also block 635):

$$V_{PIXEL} = \frac{V_{max} t_{int}}{T_{SAT}} \quad \text{(Eq. 3)}$$

where $t_{int}$ is the integration time and $V_{max}$ is the maximum signal output from pixel 110A without flipping the pixel inverter. Conversely, if TTS output voltage $V_{TTS}$ is equal to VDD, then the number of photons received by the pixel did not exceed the max allowed, and the signal is calculated exactly as in a regular 4T device (see also block 640):

$$V_{PIXEL} = V_R - V_S \quad \text{(Eq. 4)}$$

Figure 7:
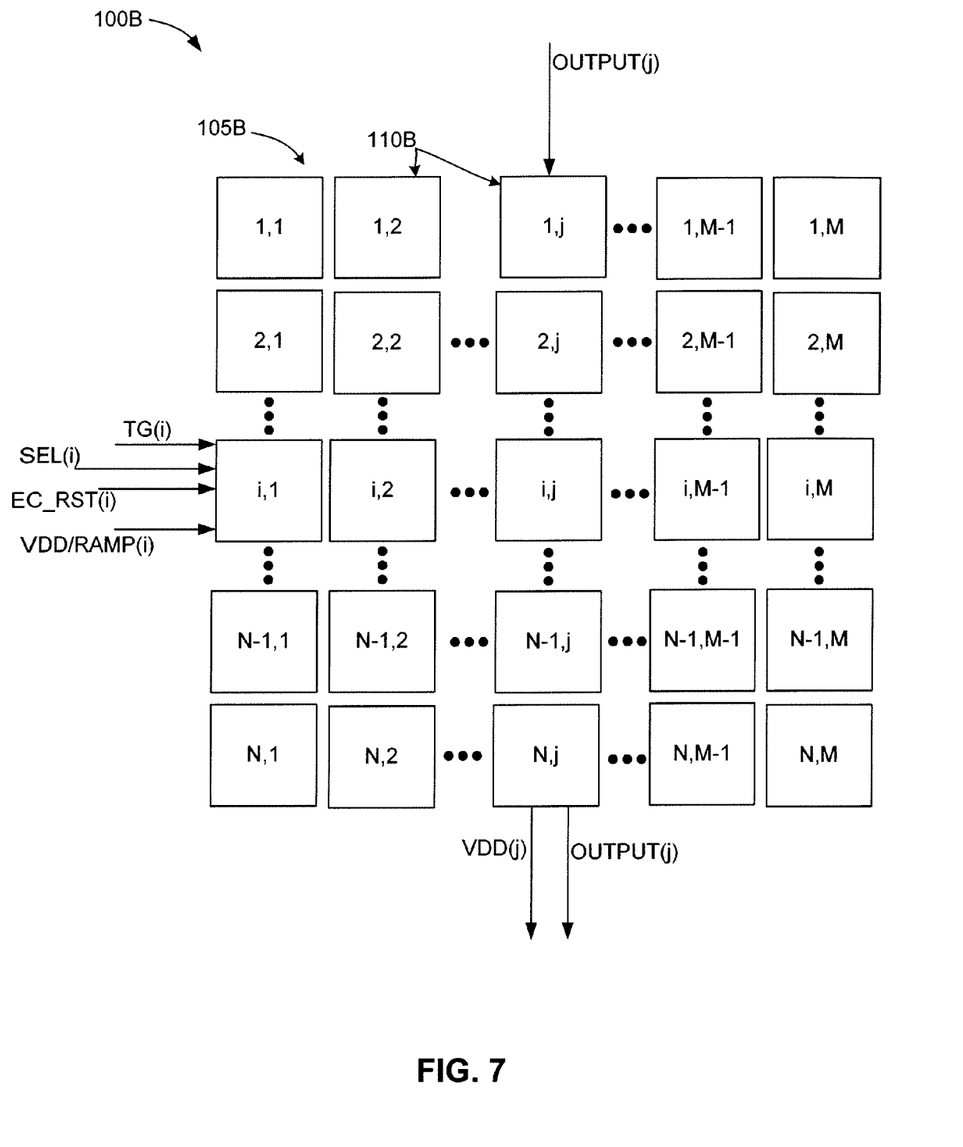
FIG. 7 is a simplified block diagram showing a pixel layout for a CMOS image sensor according to an embodiment of the present invention.

FIG. 7 is a block diagram showing a simplified array arrangement 105B associated with a CMOS image sensor 100B according to another specific embodiment of the present invention. Control signals TG, SEL, EC_RST, EC_supply and the RAMP\VDD are all supplied on horizontal lines to pixels 110B. The output signal is the only vertical line. This array fits to a rolling shutter mode. Each output column requires three S/H circuits and one CDS circuit.

Although the present invention has been described with respect to certain specific embodiments, it will be clear to those skilled in the art that the inventive features of the present invention are applicable to other embodiments as well, all of which are intended to fall within the scope of the present invention. For example, although the present invention is described with specific reference to a CMOS image sensor utilizing TTS operations to extend dynamic range, other WDR methodologies (e.g., multiple capture, synchronous self reset with multiple capture, and a-synchronous self reset with multiple capture) may also be utilized in conjunction with the CDS operations.

The invention claimed is:

1. A CMOS image sensor including a plurality of pixels disposed on a substrate, wherein each pixel comprises:
   a photodiode;
   an output chain coupled to a single signal line;
   a Wide Dynamic Range (WDR) detection circuit including means for converting a charge generated on the photodiode during an integration time period to a first output signal using a Wide Dynamic Range (WDR) operation, and for passing the first output signal to the output chain; and
   a second circuit including means for converting the charge generated on the photodiode at the end of the integration time period to a second output signal using a correlated double sampling operation, and for passing the second output signal to the output chain such that both the first and second output signals are sequentially transmitted from an output terminal of the output chain onto a single signal line.

2. The CMOS image sensor of claim 1, wherein the photodiode of each of said plurality of pixels comprises a pinned diode having a linear operating range.

3. The CMOS image sensor of claim 1, further comprising a control circuit including:
   means for causing the second circuit of a selected pixel to reset the photodiode of the selected pixel to a reset charge;
   means for causing the WDR detection circuit of the selected pixel to generate the first output signal during the integration time period after said resetting of the photodiode; and
   means for causing the second circuit of the selected pixel to generate the second output signal after the integration time period.

4. The CMOS image sensor of claim 3, wherein the control circuit further comprises means for determining an amount of light received by the photodiode of the selected pixel using the first output signal when the photodiode of the selected pixel became saturated during the integration time period, and for determining the amount of light received by the photodiode of the selected pixel using the second output signal when the photodiode of the selected pixel remained unsaturated during the integration time period.

5. The CMOS image sensor of claim 4, wherein the control circuit further comprises means for determining whether the photodiode of the selected pixel became saturated during the integration time period by comparing the first output signal with a predetermined value.

6. The CMOS image sensor of claim 1, wherein said each pixel further comprises:
   first and second capacitors disposed to generate first and second signals at first and second nodes, respectively;
   a first transfer gate connected between the first node and the photodiode;
   a first feedback transistor coupled between a first voltage source and the second node; and
   an inverter having an input terminal connected to the first node, and an output terminal connected to gate terminals of the first transfer gate and the first feedback transistor.

7. A CMOS image sensor including a plurality of pixels disposed on a substrate, wherein each pixel comprises:
   a photodiode;
   a first circuit including means for converting a charge generated on the photodiode to a first output signal using one a first operation;
   a second circuit including means for converting the charge generated on the photodiode to a second output signal using a correlated double sampling operation;
   an output chain coupled to both said first and second circuits such that both the first and second output signals are transmitted from an output terminal of the output chain onto a single signal line;
   first and second capacitors disposed to generate first and second signals at first and second nodes, respectively;
   a first transfer gate connected between the first node and the photodiode;
   a first feedback transistor coupled between a first voltage source and the second node; an inverter having an input terminal connected to the first node, and an output terminal connected to gate terminals of the first transfer gate and the first feedback transistor;

means for resetting the photodiode and the first and second capacitors such that a predetermined reset charge is stored on said first and second nodes at the beginning of an integration time period, and means for transmitting a ramp signal to the feedback transistor during the integration time period, wherein said inverter is arranged such that an output signal generated at the output terminal of the inverter causes said feedback transistor to pass said ramp signal to said second node while said photodiode remains unsaturated, and such that the output signal of the inverter changes to cause said feedback transistor to block passage of said ramp signal to said second node at a point when said photodiode becomes saturated, whereby said second capacitor captures an analog time-to-saturation value of said ramp voltage indicating the point when said photodiode became saturated.

8. The CMOS image sensor of claim 7, wherein said means for transmitting said ramp signal further includes means for transmitting a predetermined fixed voltage signal at the end of the integration time period, whereby said inverter passes said predetermined voltage signal to said second node when said photodiode is unsaturated at the end of the integration time period, whereby said second capacitor captures said predetermined voltage signal.

9. The CMOS image sensor of claim 8, further comprising means for causing said output chain to transfer said first output signal from said second node to said single signal line during a first readout phase after said end of the integration time period, whereby said first output signal is proportional to said analog time-to-saturation value when said photodiode becomes saturated during said integration time period, and said first output signal is proportional to said predetermined voltage signal when said photodiode remains unsaturated during said integration time period.

10. The CMOS image sensor of claim 9, means for transferring said charge from said photodiode to the second node after causing said output chain to transfer said first output signal from said second node to said signal line, and for causing said output chain to transfer said second output signal from said second node to said single signal line during a second readout phase after said end of the integration time period, whereby said second output signal is proportional to said charge on said photodiode during the second readout phase.

11. The CMOS image sensor of claim 10, further comprising means for determining a saturated/unsaturated state of the photodiode by comparing the first output signal with a predetermined value, for determining the amount of light received by the photodiode of the selected pixel using the first output signal when the first output signal indicates that the photodiode of the selected pixel became saturated during the integration time period, and for determining the amount of light received by the photodiode of the selected pixel using the second output signal when the first output signal indicates that the photodiode of the selected pixel remained unsaturated during the integration time period.

12. A method for determining an amount of light received by a pixel of a CMOS image sensor, said pixel including a photodiode, the method comprising:

resetting the photodiode of the pixel to a reset charge;

decoupling the photodiode during an integration time period after said resetting such that a charge is collected on said photodiode at a rate that is directly proportional to an amount of light received by the photodiode;

generating a first output signal in accordance with said charge collected on said photodiode during a the integration time period using a Wide Dynamic Range (WDR) operation; and generating a second output signal in accordance with said charge collected on said photodiode at an end of the integration time period using a correlated double sample (CDS) operation;

determining an amount of light received by the photodiode of the pixel using the first output signal when the photodiode of the pixel became saturated during the integration time period, and determining the amount of light received by the photodiode of the pixel using the second output signal when the photodiode of the pixel remained unsaturated during the integration time period.

13. The method according to claim 12, wherein generating the first output signal comprises utilizing one of a time-to-saturation operation, a multiple capture operation, a synchronous self reset with multiple capture operation, and a-synchronous self reset with multiple capture operation.

14. The method of claim 12, further comprising determining whether the photodiode of the pixel became saturated during the first time period by comparing the first output signal with a predetermined value.

15. The method of claim 12, wherein generating the first output signal comprises transmitting a ramp signal to a capacitor of the pixel during the integration time period.

16. The method of claim 15, further comprising transmitting a predetermined fixed voltage signal at the end of the integration time period.

* * * * *